Aug. 6, 1968   R. B. MORRIS   3,395,535
PNEUMATIC-HYDRAULIC TREAD BRAKE UNIT
Filed June 27, 1966
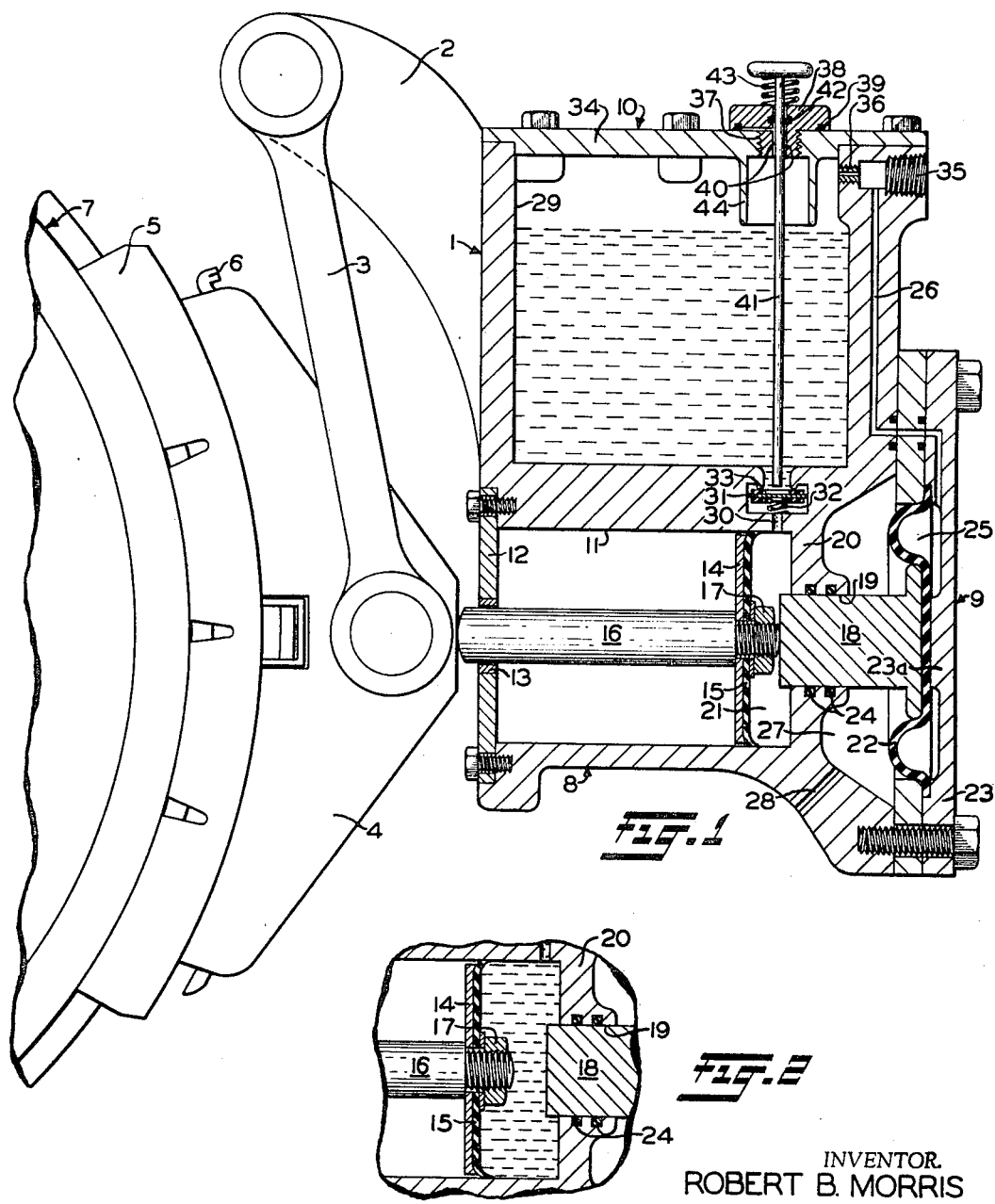
INVENTOR.
ROBERT B. MORRIS
BY Donald P. Rooney
AGENT United States Patent Office 3,395,535
Patented Aug. 6, 1968

3,395,535
PNEUMATIC-HYDRAULIC TREAD BRAKE UNIT
Robert B. Morris, Irwin, Pa., assignor to Westinghouse Air Brake Company, Wilmerding, Pa., a corporation of Pennsylvania
Filed June 27, 1966, Ser. No. 560,559
3 Claims. (Cl. 60—54.5)

ABSTRACT OF THE DISCLOSURE

A tread brake unit for a railway car wheel, comprising a brake shoe movably carried on a casing and actuated to apply braking force to the wheel by a hydraulic pressure actuated piston, the hydraulic pressure being developed responsive to displacement of a plunger into a hydraulic pressure chamber at one side of the piston by a second piston subject to compressed air pressure. A sump reservoir containing hydradulic fluid subject to the pressure of the compressed air supplies hydraulic fluid to the hydraulic chamber past a loaded check valve to automatically compensate for wear on the brake shoe, upon withdrawal of the plunger upon relief of the compressed air pressure on the second piston.

---

Heretofore known tread brake units have been employed on railway cars of the passenger type utilized in rapid transit of subway service. Such tread brake units are of rather large size employing a pivoted actuating lever through which a power cylinder obtains a force amplification in applying a braking force to a brake shoe associated with a car wheel. Moreover, such tread brake units have embodied therein an automatic slack adjusting mechanism of a complex mechanical type, for maintaining proper clearance between the brake shoe and the tread of the wheel in the brake release position. Such heretofore known tread brake units are relatively costly and present problems of installation due to space limitations in the car trucks.

Tread brake units have been heretofore proposed employing a combination of pneumatic and hydraulic pressure actuated means, but the over-all unit has been relatively large and cumbersome in size and present practical difficulties in applying them to modern type railway car trucks.

It is the object of the present invention to provide a relatively small size and lightweight tread brake unit which obtains necessary force amplification without using a relatively long actuating lever through an arrangement employing a combination of air and hydraulic pressure actuated means and which inherently provides for slack adjustment in a simple manner involving relatively few parts.

According to the invention, a novel pneumatic-hydraulic tread brake unit is provided, comprising a casing on which a brake shoe is movably supported for actuation by a hydraulic pressure actuated piston operable in a bore in the casing, the hydraulic pressure being developed and relieved in the hydraulic piston chamber in the bore by a plunger which is reciprocated therein by supply and release of compressed air to a piston member to which the plunger is operatively connected. Hydraulic fluid is communicated to the hydraulic piston chamber from an oil sump reservoir, formed in the casing, past a one-way or check valve which traps the oil in the hydraulic piston chamber. Pneumatic pressure is communicated to the top of the oil in the sump reservoir via a chocked communication concurrently with supply of pneumatic pressure to the pneumatic pressure actuated piston to initially fill the hydraulic piston chamber with oil. The chocked communication so restricts the release of pneumatic pressure from the top of the oil in the sump reservoir, upon release of pneumatic pressure from the piston member actuated thereby, as to cause enough oil to be supplied to the hydraulic piston chamber as the plunger is withdrawn therefrom on brake release as to maintain the brake shoe constantly in contact with the tread of the wheel notwithstanding wear of the brake shoe. Manually operated means is provided for unseating the check valve to permit reverse flow of oil from the hydraulic piston chamber to the sump reservoir, as desired, for emergency release of the brakes or replacement of the brake shoes.

In the accompanying drawings:

FIG. 1 shows a side view, partially in section, of a brake unit embodying the invention.

FIG. 2 is a fragmentary view of the main cylinder bore showing the position of the piston and piston rod after the brake shoe has been worn from numerous applications.

As shown in the drawings, a pneumatic-hydraulic tread brake unit, one of which is provided for each wheel of a railroad car truck is suitably secured, as by bolts and nuts, to the frame of the car truck.

As further shown in the drawings, the brake unit comprises a casing 1 having a support 2 extending therefrom and an H-shaped or double clevis shaped brake hanger 3 pivotally mounted from said support and carrying a brake head 4 pivoted at the lower end of the hanger 3.

A brake shoe 5 is secured to the brake head in conventional manner by a pin 6. As will be explained more fully hereafter, the brake shoe 5 constantly contacts the tread of a wheel 7.

The casing 1 comprises three main secitons, namely a hydraulic power cylinder seciton 8, a pneumatic pressure actuating cylinder section 9 and a sump section 10.

The power cylinder section 8 comprises a main cylinder bore 11 within the casing having a cylinder head 12 closing the bore 11 at one end, and the cylinder head 12 having a centrally located bearing 13 located therein. Within the main cylinder bore 11 is a power piston 14 carrying a packing cup 15 to which a piston rod 16 is coaxially secured as by a nut 17, screwed to the reduced diameter end of the piston rod 16 which is threaded and extended through a central hole in the piston. Piston rod 16 also extends the length of the main cylinder bore 11 and through the central bearing 13 of the cylinder head 12 and the rounded end thereof contacts the flat surface heel of the brake head 4.

The pneumatic pressure actuating cylinder 9 comprises an actuating plunger or piston 18 which extends through a bore 19 in a wall 20 into a chamber 21 within the bore 11. The chamber 21 is between the piston 14 and the wall or partition 20.

An enlarged disc-like portion at the other end of the piston 18 contacts one face of a diaphragm 22 which is peripherally clamped by a cylinder head 23 in the tight sealed relation against the casing 1 and seated against piston stop 23a. Leakage of the fluid from chamber 21 past the actuating piston 18 by way of bore 19 is prevented by O-ring seals 24 which are carried in annular grooves in the bore 19 of the wall 20.

Fluid under pressure from a suitable source is supplied to a pressure chamber 25 of the actuating piston 18 at one side of the diaphragm 22 by way of a passage 26 under control of the operator. A chamber 27 is formed on the other side of diaphragm 22 from the chamber 25 between the diaphragm 22 and the wall 20, and is constantly open to atmosphere through a vent port 28.

The sump section 10 comprises a sump chamber 29 which communicates with chamber 21 by way of a passage 30 which contains a one-way check valve 31 biased by a spring 32 into seating relation with an annular valve seat 33 for a purpose that will be hereinafter explained. The sump chamber 29 is closed at the top by a cover plate 34 suitably secured in sealed relation to the casing 1 as by a plurality of screws as shown in FIG. 1. The wall of the casing 1 has a port 35 threaded at its outer end and having at its inner end a choke 36. Fluid under pressure is communicated by conventional operator controlled means through the port 35 and choke 36 to the space above the liquid in sump chamber 29 and also to the passage 26 which opens out of the port 35.

Hydraulic fluid is initially supplied to the sump chamber 29 through a filling port 37 in the cover plate 34. The filling port is closed, as by a screw plug 38 secured therein. Plug 38 has a flange portion, the inner face of which seals against the cover plate 34, as by means of an O-ring seal 39, in an annular groove in the underside of the flanged portion. In the center of the plug 38 is bore 40 through which a release rod 41 extends into sump chamber 29 and the end of which terminates in close proximity to check valve 31 in the bottom of the sump chamber 29. A grommet 42 seals the bore 40 against leakage of hydraulic fluid along the rod 41. A small spring 43 interposed between the flanged portion of the plug 38 and the head at the exterior end of the rod 41 biases the rod upward to a position free of the check valve which allows seating thereof. When rod 41 is depressed, it engages and unseats the check valve 31.

On the inside of the cover plate 34 and surrounding filling port 37 is an inwardly extending overflow prevention cylinder 44 which prevents the liquid rising to the level of the choke 36.

*Operation*

Let it be assumed that the sump chamber 29 and the chamber 21 of the casing 1 have been suitably filled with hydraulic fluid and that it is desired to effect a brake application. To effect a brake application, the operator, through conventional brake control means (not shown) causes fluid under pressure, such as compressed air, to be supplied to port 35 and then, by way of the passage 26 to the pressure chamber 25 at one side of the diaphragm 22. At the same time, compressed air will be supplied by way of choke 36, to the space above the hydraulic fluid in the sump chamber 29 to correspondingly pressurize the liquid in the sump section 10. The force of the pneumatic pressure on one side of the diaphragm 22 is communicated to the actuating piston 18 which is at rest against piston rod 16 and this force is complemented by the hydraulic fluid under pressure in chamber 21 acting against piston 14 due to movement of piston 18 into chamber 21 and the displacement of the fluid therein proportional to the increased volume of piston 18 within chamber 21. The force on power piston 14 is thus exerted, by way of piston rod 16, against the brake head 4 for applying the brake shoe 5 on the tread of the wheel 7. It will be understood that brake shoe 5 is normally in contact with the tread of the wheel so that only slight axial movement of the piston rod is required to effect exertion of braking force on the wheel.

Upon releasing the pneumatic pressure from chamber 25 under the control of the operator, the hydraulic pressure in chamber 21 acting on the end of piston 18 causes diaphragm 22 to return to its position of rest against stop 23a as shown in FIG. 1 of the drawing. Thus the hydraulic pressure in chamber 21 which is also acting on power piston 14 causes the rod 16 to remain against the heel of the brake head 4. It will be apparent that as the compressed air is released from the pressure chamber 25, choke 36 retards return flow of compressed air from the space above the liquid at the top of the sump chamber 29. Thus the liquid in the sump chamber 29 remains pressurized at the same time as the piston 18 is withdrawn from chamber 21 to effect a reduction of pressure in the chamber 21. A differential pressure is thus created between sump chamber 29 and chamber 21 which forces the check valve 31 in passage 30 off its seat 33 allowing fluid to flow from said sump chamber 29 into chamber 21 to compensate for space provided by the withdrawal of the piston 18. Accordingly, the hydraulic fluid in chamber 21 causes power piston 14 and piston rod 16 to hold brake shoe 5 in a light-pressure (nonbraking) contact with the tread of the wheel 7. At this time, some clearance between the end of the piston 18 and the piston rod 16 may occur.

On repeated subsequent applications of the brakes under control of the operator, brake shoe 5 wears and the power piston 14 and the piston rod 16 will, as before, apply a braking force to the brake shoe 5 which remains in contact with the tread of the wheel 7. It will be seen that wear of the brake shoe will be compensated for by the automatic hydraulic slack adjusting action of the hydraulic power section. As wear of the brake shoe 5 occurs, power piston 14 will move progressively leftward from the position in which it is shown in FIG. 1 to a position such as that illustratively shown in FIG. 2. As before described, the increased volume in chamber 21 resulting from the progressive shifting of power piston 14 leftward is automatically filled with hydraulic liquid from sump chamber 29 via check valve 31, each time the actuating piston is withdrawn from chamber 21 on release of the brakes. Thuse chamber 21 is always completely filled with hydraulic liquid so that as the actuating piston 18 repeatedly moves into chamber 21, it displaces a relatively equal amount of hydraulic fluid each time, thus exerting a substantially uniform hydraulic force on the power piston 14, rod 16 and brake head 4 corresponding to a given fluid pressure in diaphragm chamber 25.

If at any time an emergency brake release is necessitated or the removal of or changing the brake shot 5 is required, the release rod 41 may be operated by depressing it manually. For an emergency brake release, as when the car is alone on a siding with the brakes on, depression of the rod 41 results in equalization of pressure in chambers 21 and 29 via the unseated check valve 31, with the result that only a slight amount of force remains on the brake head 4 and shoe 5 via rod 16, to keep the brake shoe 5 in constant contact with tread 7 of the wheel.

When the brake shoe is to be removed for repair or replacement, depression of the rod 41 causes the pressure in the chambers 21 and 29 to be equalized. However, it is necessary to pry the brake shoes away from the tread of the wheel 7 because the hydraulic fluid in chamber 21 cannot be displaced to chamber 29 without some external force being applied to the piston 14 through the rod 16. This force may be exerted by a crow-bar inserted between the tread of the wheel 7 and the brake shoe 5 to pry it away from the tread of the wheel and thus move the piston 14 and rod 16 towards the actuating piston 18 until rod 16 and piston 18 touch as shown in FIG. 1.

Obviously, a certain amount of hydraulic fluid will remain in the chamber 21 and will not be returned to the sump chamber when this force is exerted since when the threaded end of the brake rod 16 comes in contact with the actuating piston 18 no further compression force can be exerted on the liquid in chamber 21 to cause flow to sump chamber 29.

Although a specific embodiment of the invention has been shown, it is with full awareness that other modifications thereof are possible within terms of the pending claims.

Having now described the invention, what I claim as new and desire to secure by Letters Patent is:

1. Fluid pressure braking apparatus, comprising:
 (a) a braking member for frictionally applying a braking force to a member to be braked,
 (b) hydraulic cylinder means,
 (c) piston means in said hydraulic cylinder means having a chamber at one side thereof in which hydraulic fluid is trapped, (d) a plunger projecting into said chamber,
(e) another piston means subject to compressed air pressure for exerting force on said plunger to displace hydraulic fluid in said chamber and thereby provide hydraulic fluid pressure on the said piston means,
(f) means actuated by the said piston means for transmitting a brake-applying force to said braking member,
(g) a rservoir containing a supply of hydraulic fluid,
(h) a one-way valve operative to communicate hydraulic fluid from the reservoir to the chamber to compensate for slack developed due to wear on said braking member,
(i) passage means via which to communicate compressed air simultaneously to said reservoir to pressurize the liquid therein and to act on the said another piston means, and
(j) choke means in said passage means via which fluid under pressure is supplied to said reservoir, said choke means inhibiting release of compressed air pressure from said reservoir to exert pressurization therein effecting automatic supply of hydraulic fluid from said reservoir to said chamber to maintain contact between the said braking member and the member braked thereby, upon release of compressed air from the said another piston means and compensating for wear of the braking member.

2. Fluid power brake apparatus as claimed in claim 1, further characterized by manually actuated means for effecting unseating of said one-way valve to effect reverse flow of the fluid from the said chamber to the said reservoir to equalize pressures therein and effect a brake release.

3. Fluid power braking apparatus as claimed in claim 1, further characterized by manually operable stem means, accessible for operation from the exterior of said reservoir and extending through said reservoir, the length of said stem engaging the one-way valve to unseat it upon depression of said stem, and biasing means for returning said stem to a position in which the one-way valve is reseated upon release of operating pressure on the said stem.

References Cited
UNITED STATES PATENTS

| | | | |
|---|---|---|---|
| 2,626,021 | 1/1953 | McAlpine | 188—153 XR |
| 2,827,766 | 3/1958 | Hufford. | |
| 2,926,758 | 3/1960 | Frola | 188—153 |

MARTIN P. SCHWADRON, *Primary Examiner.*

R. R. BUNEVICH, *Assistant Examiner.*